H. C. SCHAPER.
WEIGHT INDICATOR FOR SCALES.
APPLICATION FILED FEB. 28, 1919.
1,357,731.
Patented Nov. 2, 1920.
2 SHEETS—SHEET 2.
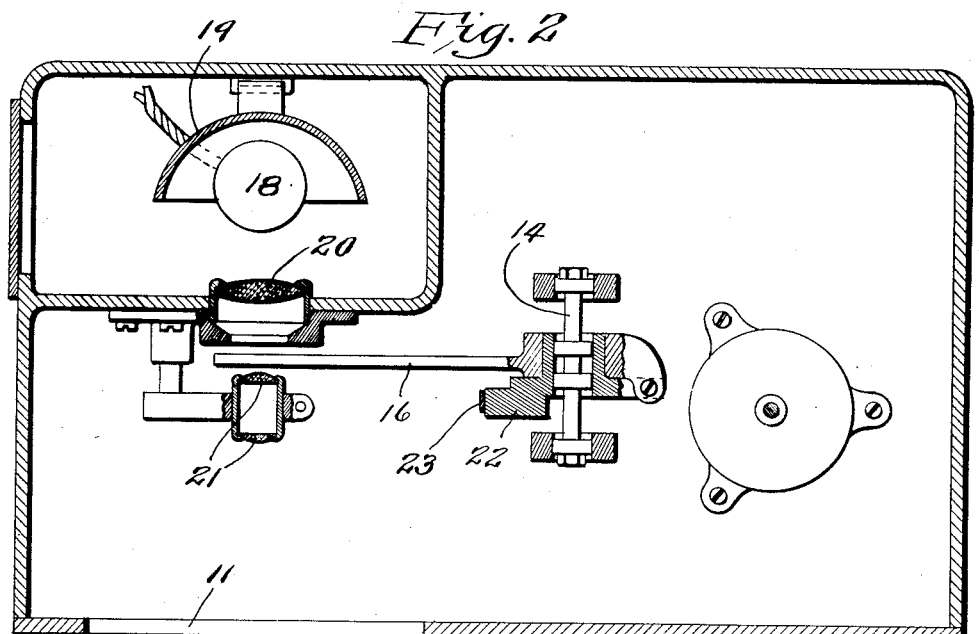
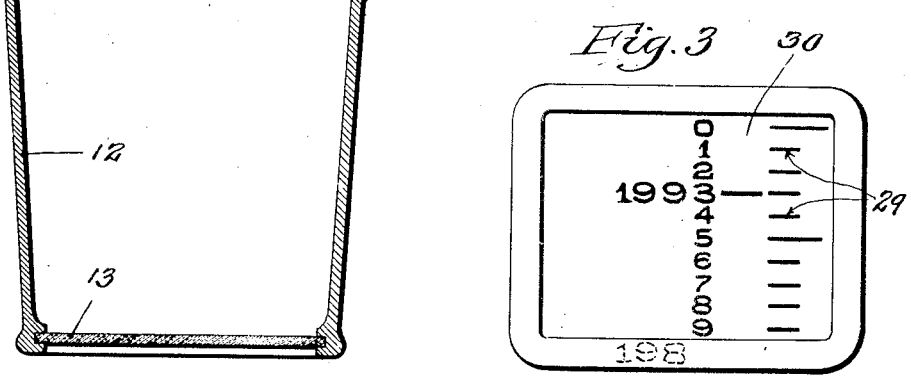
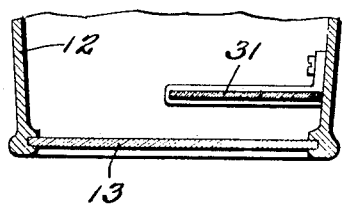
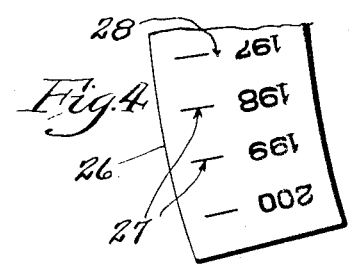
Inventor
Henry C. Schaper
By F. H. Cornwall, Atty.

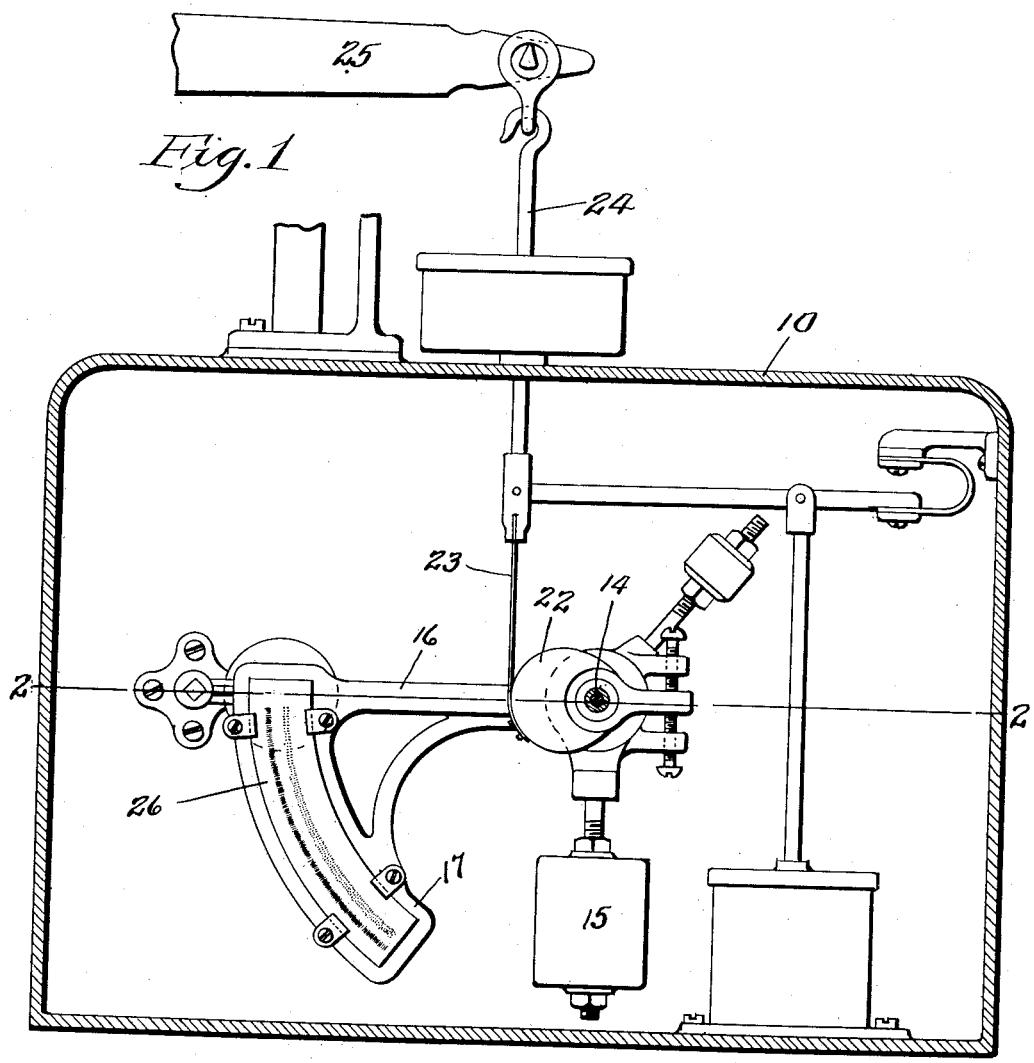

UNITED STATES PATENT OFFICE.

HENRY C. SCHAPER, OF ST. LOUIS, MISSOURI, ASSIGNOR TO THE GENERAL AUTOMATIC SCALE COMPANY, OF ST. LOUIS, MISSOURI, A CORPORATION OF MISSOURI.

WEIGHT-INDICATOR FOR SCALES.

1,357,731.  Specification of Letters Patent.  Patented Nov. 2, 1920.

Application filed February 28, 1919. Serial No. 279,791.

*To all whom it may concern:*

Be it known that I, HENRY C. SCHAPER, a citizen of the United States, residing at St. Louis, Missouri, have invented a certain new and useful Improvement in Weight-Indicators for Scales, of which the following is a full, clear, and exact description, such as will enable others skilled in the art to which it appertains to make and use the same, reference being had to the accompanying drawings, forming part of this specification.

My invention relates generally to scales or weighing machines, and more particularly to an automatically operating weight indicating mechanism which is directly connected to and operated by a movable part of the scale mechanism, for instance, the scale beam or lever, and my present invention is an improvement upon the weight indicator for scales disclosed in my copending application filed December 18, 1917, Serial Number 207,683.

The principal object of my present invention is to provide an automatic weight indicator that is particularly applicable for use in connection with scales of relatively large capacity, that is, scales which weigh loads of two thousand pounds and upward; further, to arrange and construct the indicating mechanism so that it will produce upon a screen or ground glass, and consequently give to the weighman, a relatively large reading or appearance of the weight indicating numerals and the graduations adjacent to said numerals; and further, to arrange the graduated scales and weight indicating numerals associated therewith so as to give upon the ground glass or screen a reading of the individual or unit pounds of the weights placed on the scales, thereby enabling the weighman or person in charge of the scales to ascertain very accurately or to the fractional part of a pound, the exact weight of comparatively heavy loads or loads weighing two thousand pounds and upward.

Heretofore it has been the general practice in producing automatic weight indicators for scales to arrange a dial bearing near its outer edge a graduated scale and to arrange a pointer to travel over said dial. This arrangement is feasible for low capacity scales or scales weighing up to one thousand pounds, but to provide this same arrangement for accurately indicating weights on a large capacity scale, would not be feasible, by reason of the fact that a dial bearing a scale having two thousand or more pound indicating graduations and numerals, would be altogether too large for practical purposes. For instance, to provide a dial and pointer arrangement for a scale capable of weighing loads up to two thousand pounds, and to indicate the individual pounds of the loads, the graduated scale on the dial would necessarily require two thousand graduated marks. Assuming these marks to be arranged ten to the inch, which is a comparatively fine graduation, and not readily readable, the resulting graduated scale would necessarily be two hundred inches in length, and of a diameter of approximately sixty-six inches. By my improved construction, in combination with the projecting means disclosed in my copending application hereinbefore mentioned, I am able to produce a weight indicator which will give accurate readings of the individual pounds of relatively large capacity scales, said indicating mechanism being very compact and applicable for use in connection with practically all forms of beam scales.

With the foregoing and other objects in view, my invention consists in certain novel features of construction and arrangement of parts, hereinafter more fully described and claimed, and illustrated in the accompanying drawings, in which—

Figure 1 is a vertical sectional view taken through the center of an automatic weight indicator of my improved construction and showing the connections between the operating parts of said indicating mechanism and the beam of a scale.

Fig. 2 is a horizontal section taken approximately on the line 2—2 of Fig. 1.

Fig. 3 is a front elevational view of the screen or ground glass upon which the weight indicating numerals and graduated scale marks are shown.

Fig. 4 is an enlarged elevational view of a part of one of the graduated scale bearing members forming a part of my invention.

Fig. 5 is a horizontal section taken through a portion of the casing of my improved indicator and showing a modified arrangement of one of the graduated scale bearing members.

Referring by numerals to the accompanying drawings which illustrate a practical embodiment of my invention, 10 designates the housing or casing which incloses the operating parts of the indicating mechanism, 11 an opening formed in the front wall of said housing, and 12 a sub-housing extending forwardly from the front wall of housing 10 around said opening 11 and said sub-housing being provided at its front end with a screen 13 of translucent material, preferably ground glass.

Mounted for rotation in suitable anti-friction bearings within the housing is a horizontally disposed shaft 14 from which depends a pendulum weight 15. Shaft 14 also carries an arm 16 which is disposed substantially at right angles to the weight 15 and carried by the outer end of this arm is an arcuate frame 17 which is concentric with the axis of shaft 14 and said frame carrying one of the graduated scale bearing members forming a part of my invention and hereinafter more fully described.

Arranged in the rear portion of housing 10 and directly to the rear of screen 13 and opening 11 is a source of light 18, preferably an electric lamp, to the rear of which is arranged a reflector 19 and located in front of this lamp and immediately to the rear of the vertical plane traversed by frame 17 is a condensing lens 20. Arranged in front of this lens and in front of the vertical path of travel of frame 17 are projecting lenses 21, the same being mounted so that they may be adjusted toward and away from the condensing lens.

Shaft 14 carries an eccentrically arranged disk 22 and connected thereto is the lower end of a flexible member such as a metal tape 23. Connected to the upper portion of this tape and extending upwardly through the top of housing 10 is a rod 24, the upper end of which is connected in any suitable manner to the movable part of a weighing scale, preferably the beam 25.

All of the parts just described are practically identical in construction and operate the same as the corresponding parts illustrated and described in my copending application hereinbefore referred to.

Carried by frame 17 and removably positioned thereupon is a section 26 of transparent material such as glass, celluloid or the like, the same bearing an arcuate scale composed of a row of graduations or marks arranged at equal distances apart and there being weight indicating numerals adjacent to each mark.

A portion of the member 26 is shown in detail in Fig. 4, the graduated marks thereon being designated by the numeral 27 and the weight indicating numbers being separated from said marks by a narrow space 28. The spaces between the marks 27 of this scale are equal in length and each space represents a certain number of pounds,—in the present instance, ten pounds,—and consequently the numbers opposite said marks increase by tens from zero to the capacity of the indicating apparatus and which in the present instance is two thousand pounds. The lower one of the marks on the scale is numbered "200;" the next adjacent mark "199;" the next one "198" and so on down to zero at the other end of the scale, these numbers representing the thousands, hundreds and tens of the weight indicating numerals.

Appearing on one of the faces of the screen or ground glass 13 and preferably the inner face and adjacent to the righthand side thereof, is a vertically disposed row of marks 29, ten in number and said marks being arranged at equal distances apart. Appearing on the face of the screen or ground glass 13 and separated from the lefthand ends of the marks 29 by a vertically disposed space 30, is a vertically disposed row of numerals from zero to nine inclusive, and said numerals are arranged directly opposite the marks 29. The numbers in this row or the units of the weight indicating totals and the parts of the apparatus, particularly the projecting lenses 21, are arranged so that the numbers opposite the graduated scale marks on member 26 will appear directly to the lefthand of the vertical row of units, as illustrated in Fig. 3, and thus the three numerals of each number on the arcuate scale will combine with one of the units indicating numerals to indicate the total weight of the load placed on the scale platform.

In operation, a load placed on the scale platform will raise the outer end of beam 25, and as a result, shaft 14 will be rocked through connections 24, 23 and 22, and as the shaft is thus rocked, arm 16 carrying frame 17 and member 26 which is provided with the arcuate scale will swing upward until the scale balances. The rays of light from lamp 18 will be thrown from reflector 19 forwardly through condensing lens 20; thence through transparent member 26 bearing the arcuate scale, and the graduated mark on said scale which is in direct alinement with the centers of the lenses will be directed forwardly by the projecting lenses 21 onto the screen or ground glass 13. In thus being projected onto the screen, the graduated mark of the arcuate scale and the number opposite said mark will be greatly enlarged so that when the number appears on said screen, it will be approximately the same size as the numbers of the vertical row of unit indicating numbers and which latter, it will be understood, are arranged on the rear face of the screen.

Thus, if the weight of a load placed on the scale platform is nineteen hundred ninety-three pounds, member 26 will stop with the graduated mark number "199" directly in line with the centers of the lenses and by the projecting lenses, this numbered mark will be projected onto the screen 13 with the number "199" directly in front of the units indicating numeral "3" and with the mark 27 which is opposite the number "199" appearing in the space 30 between the units indicating numeral "3" and the mark 29 which is directly opposite said numeral. Or, in the event that the mark 27 appearing on the screen is positioned between two of the marks 29, then the weighman will readily understand that the actual weight of the load is a half pound more than the weight indicated by the numbers appearing on the screen.

Inasmuch as the height of the screen or ground glass is, in practice, approximately two and one-half or three inches, and the graduated scale comprising the numbered marks 29 extend from the top to the bottom of said screen, it will be understood that the total weight indicating numerals appearing on said screen and noted by the weighman will be of sufficient size to be readily readable from a point a considerable distance away from the front of the screen.

Inasmuch as the member 26 bearing the arcuate scale comprising the numbered marks 27 is, in practice, less than five inches in length, it will be understood that the numbers and graduated marks of said scale are very minute or microscopic in size, especially where the indicator is used in connection with large capacity scales, but by projecting the marks of this scale by means of lenses, said marks and numbers are greatly magnified and appear in considerable size on the screen or ground glass.

In some instances it may be found desirable to arrange the graduated scale composed of the numbered marks 29 upon a section of transparent material 31 of glass, celluloid or the like, and arrange the latter within the sub-housing 12 a short distance to the rear of screen 13 (see Fig. 5), in which event the graduated marks 29 and numbers opposite the same will be projected from said transparent member 31 onto the screen 13 with the graduated numbers from the arcuate scale carried by member 26.

A weight indicator of my improved construction is comparatively simple, is entirely automatic in operation, is very compact, can be utilized in connection with practically all types of beam scales, is instantly responsive to loads placed on the scale platform, and is effective in giving to the users the exact weight to a pound or less of relatively heavy loads placed on the scales with which the device is associated, and the weight indicating numbers being comparatively large and readily readable from points of considerable distances away from the screen or ground glass.

It will be readily understood that minor changes in the size, form and construction of the various parts of my improved weight indicator can be made and substituted for those herein shown and described, without departing from the spirit of my invention, the scope of which is set forth in the appended claims.

I claim:

1. The combination with a weighing scale and its beam, of a weight indicator comprising a source of light, a transparent member arranged for operation in the path of travel of the light rays from said source of light, said transparent member bearing a graduated scale including weight indicia, flexible means connecting said transparent member with the scale beam whereby said transparent member is moved by the scale beam, a screen, a graduated scale thereupon, and means coöperating with the source of light for projecting the marks of the graduated scale onto said screen adjacent to the graduated scale thereupon.

2. The combination with a weighing scale, of a pendulum weight connected to and adapted to be actuated by a movable part of the scale, a member carried by said pendulum weight, and bearing weight indicia, a screen bearing weight indicia, and means for projecting the indicia from the member carried by said pendulum to said screen adjacent to the indicia thereupon.

3. The combination with a weighing scale, of a pendulum weight connected to and adapted to be actuated by a movable part of said scale, a transparent member carried by said pendulum weight and bearing weight indicia, a screen bearing weight indicia, and means including a source of light and lenses for projecting in enlarged form the weight indicia from said transparent member to points on the screen adjacent to the weight indicia thereupon.

4. The combination with a weighing scale and its beam, of a weight indicator comprising a source of light, lenses arranged in the path of travel of the light rays from said source of light, a transparent member arranged for movement between said lenses and connected to the beam of the scale so as to be actuated by loads placed on the scale platform, said transparent member bearing weight indicia, and a screen in front of said transparent member, which screen bears weight indicia.

5. The combination with a weighing scale, of a member mounted for operation and connected to a movable part of the scale so as to be moved in one direction by loads applied to the scale platform, said member being mounted so as to return to its normal position by gravity, a member bearing weight indicia, which last mentioned member is movable with the first mentioned member, a screen bearing weight indicia, and means including a source of light and lenses for projecting the weight indicia from said member in enlarged form onto said screen adjacent to the weight indicia on the latter.

6. The combination with a weighing scale and its beam, of a weight indicator comprising a movably mounted member bearing weight indicating numerals, connections between said member and the beam of the scale whereby said member moves with said beam, a screen bearing weight indicating numerals, and means for projecting the weight indicating numerals from said movably mounted member in enlarged form onto said screen adjacent to the weight indicating numerals thereupon.

7. The combination with a weighing scale and its beam, of a member provided with weight indicating characters, means connecting said member with the scale beam for moving said member in direct ratio to the movement of the scale beam, a screen bearing weight indicating characters, and means for projecting the weight indicating characters from said member in enlarged form onto said screen adjacent to the characters thereupon.

8. The combination with a weighing scale and its beam, of a weight indicator comprising a source of light, a transparent member arranged for operation in the path of travel of the light rays from said source of light, which transparent member is provided with a graduated scale including weight indicating numerals, flexible connections between the transparent member and scale beam whereby said member moves with said beam, a screen bearing a row of numerals, and means coöperating with the source of light for projecting the numerals of the graduated scale from the transparent member onto the screen adjacent to the numerals thereupon.

In testimony whereof I hereunto affix my signature this 22nd day of February, 1919.

HENRY C. SCHAPER.